April 12, 1932. J. J. WALTER 1,854,086
CRUDE OIL DISTILLING APPARATUS
Filed April 5, 1929
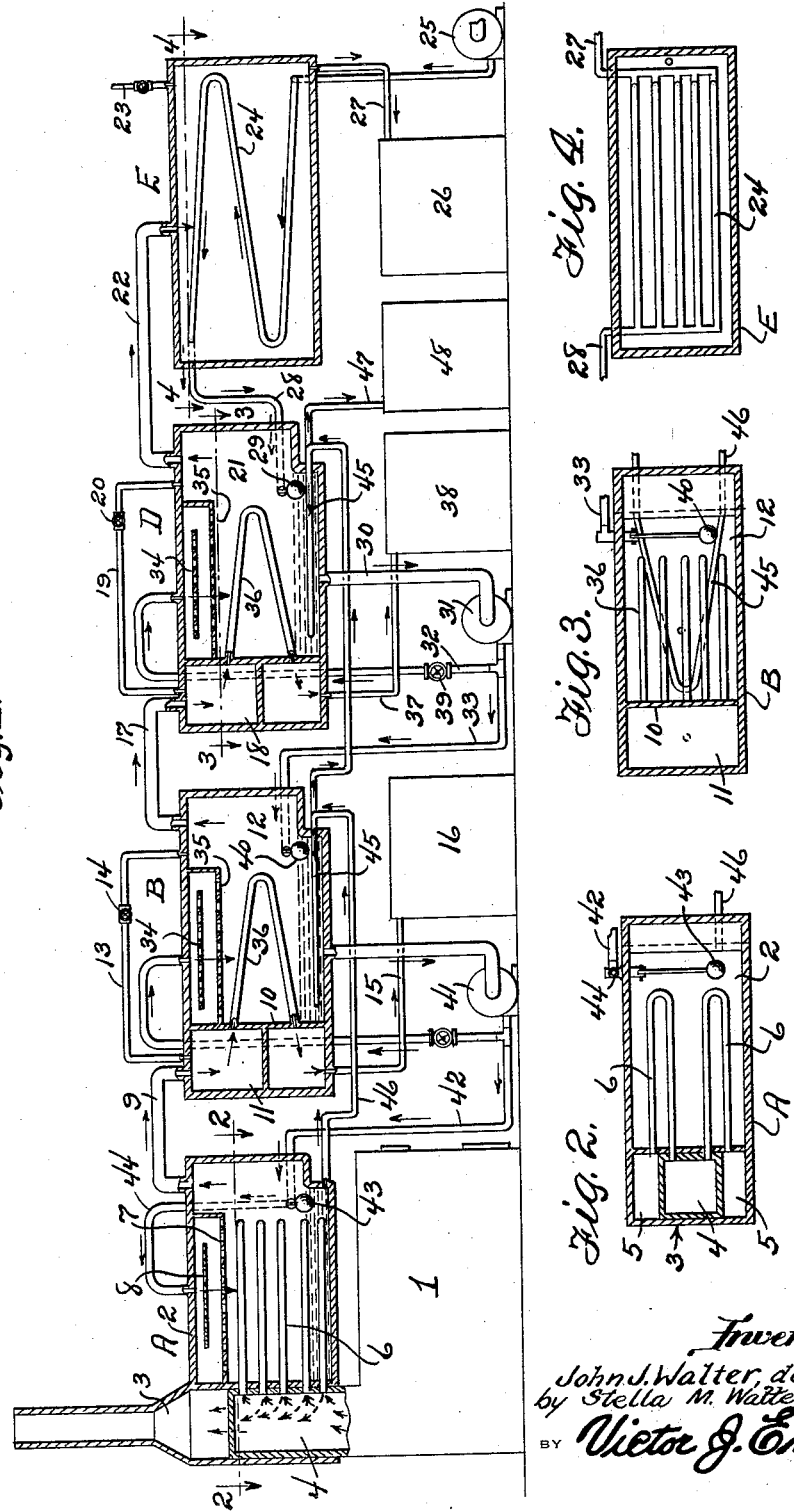
Inventor:
John J. Walter, deceased,
by Stella M. Walter, Executrix
BY Victor J. Evans
ATTORNEY Patented Apr. 12, 1932

1,854,086

UNITED STATES PATENT OFFICE

JOHN J. WALTER, DECEASED, LATE OF GLENDALE, CALIFORNIA, BY STELLA M. WALTER, EXECUTRIX, OF GLENDALE, CALIFORNIA

CRUDE OIL DISTILLING APPARATUS

Application filed April 5, 1929. Serial No. 352,814.

This invention relates to a process and apparatus for distilling crude oil, the general object of the invention being to provide an apparatus which is simple in construction and operation, economical in fuel and one which can be constructed at low cost.

Another object of the invention is to so arrange and construct the parts that the lighter materials are removed from the crude oil at the first part of the process, thus reducing the quantity of crude oil to be heated by the furnace and to provide means for causing the oil to pass over the vaporizing means in the form of a film, thereby requiring less heat to vaporize the oil than when the oil is vaporized in bulk.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a diagrammatic sectional view of the apparatus.

Figure 2 is a section on line 2—2 of Figure 1.

Figure 3 is a section on line 3—3 of Figure 1.

Figure 4 is a section on line 4—4 of Figure 1.

In the drawings, A indicates the heating apparatus which comprises the furnace 1 and the vessel 2. The furnace 1 is provided with the usual chimney 3, the lower part of which is formed with a central chamber 4 which leaves the passages 5 at the sides of the chimney. A plurality of U-shaped tubes 6 is arranged in the vessel 2, one limb of each tube being in communication with the chamber 4, and the outer limb of each tube being in communication with one of the passages 5. Thus the products of combustion from the furnace will pass into the chamber 4 and flow through the tubes into the passages 5, from which they will escape through the upper part of the chimney. The flow of the products of combustion through the tubes will highly heat the same, as will be understood. A perforated partition 7 is arranged above the tubes and a perforated distributor plate 8 is arranged over this partition.

A tube 9 connects the vessel A with the vessel B, the tube being connected with that end of the vessel A which is opposite the stack or chimney and the tubes 6 terminate short of this end of the vessel. A partition 10 is arranged adjacent one end of the vessel B and divides the same into a condensing chamber 11 and a vaporizing chamber 12. The tube 9 leads the vapors from the vessel A into the chamber 11 of the vessel B and a pipe 13, containing a valve 14, connects the upper part of the chamber 11 with the chamber 12, so that the uncondensed vapors in chamber 11 will pass into the chamber 12. The condensed liquids, collecting in the bottom of the chamber 11, will pass through the tube 15, into a tank 16. The vapors in chamber 12 will pass through a tube 17 into the condensing chamber 18 of a vessel D which is constructed similarly to the vessel B, the vapors in chamber 18 passing through a pipe 19 containing a valve 20, into the chamber 21 of the vessel D and from this chamber 21, the vapors will pass through a tube 22 into a vessel E and from this vessel, the uncondensed vapors will pass through a pipe 23 to any desired point. A coil 24 is arranged in the vessel E through which crude oil is pumped from any suitable source by a pump 25, and the vapors, contacting with the coils 24 which contain the cold crude oil, will be condensed and the condensed liquids, collecting in the bottom of the vessel E, will pass into a tank 26 through a pipe 27. The oil passing through the coil 24 thus acts as a condensing medium for the condensible vapors passing into the vessel E from the tube 22 and these vapors will heat the oil in the coils. The heated oil will pass from the coils through a pipe 28 into the bottom part of the chamber 21 of vessel D. The level of oil in said chamber 21 is controlled by a float valve 29. A pipe 30 connects the bottom of the chamber 21 with a pump 31 and pipes 32 and 33 lead from the outlet of the pump, the pipe 32 delivering the oil into the top of the vessel D, where it falls upon the perforated distributor plate 34 and passes through the perforated partition 35 and drops upon the V-shaped coils 36 which have their ends in communication with the condensing chamber 18, so that this oil is distributed in a film on the tubes 36 which contain the hot vapors so that some of the oil is vaporized and some of the vapors in the tubes are condensed, the condensed liquids flowing back into the chamber 18 and passing through the pipe 37 into a tank 38. The pipe 32 is provided with a valve 39. Some of the oil from the pump 31 will pass through the pipe 33 into the chamber 12 of vessel B, in which the level of oil is controlled by a float valve 40, and the oil in vessel B is pumped by a pump 41 to the top part of the vessel B, the chamber 12 of which is also provided with a distributing plate, a perforated partition and the V-shaped coils, similarly to the vessel D. Some of the oil from the pump 41 is carried by the pipe 42 to the vessel A, the oil level in which is regulated by a float valve 43, and a pipe 44 carries some of the oil to the top of the tank A, where it passes through the distributor plate 8 and the partition 7 upon the coils 6.

Coils 45 are arranged in the bottom of each of the tanks B and D for heating the oil therein, these coils being connected by the pipes 46 with one another and with the vessel A, so that the hot oil in the vessel A will pass through the coils and will then pass from the coil in vessel D through the pipe 47 into the tank 48.

Thus it will be seen that the crude oil will first be pumped into the coil 24, where it is heated from the vapors entering the vessel E through the pipe 22 and then the oil will pass to the vessels D and B and finally pass to the vessel A. Some of the oil is pumped into the top part of each vessel A, B and D, where it is distributed in films on the coils 36 in vessels D and B and on the coils 6 in vessel A. Thus other portions of the oil are vaporized in the vessels and the vapors pass from one vessel to another until the uncondensible vapors pass from the vessel E through the pipe 23. The condensed vapors are carried into suitable tanks from the condensing chambers in the vessels B, D and E.

From the foregoing it will be seen that a large part of the crude oil is evaporated in vessel D and another large part in vessel B, so that there is but a comparatively small part of the oil to be heated in the vessel A. Thus the oil is vaporized with the minimum amount of fuel.

By passing the oil over the tubes heated by the vapors in the form of a film, the oil is quickly vaporized and with less heat than is required if the oil were heated in bulk.

The following example is given of the operation of the device:

The crude oil enters the coil 24 in vessel E at about 80° and passes from the coil at about 150°. About 25% of the crude oil is vaporized in vessel D and passes into vessel E at about 250°. The residuum oil from vessel A flowing through the coils 45 in vessels B and D are about 450° so that the oil in vessels B and D are heated by this oil and the vapors passing from vessel A to vessel B are about 450°, while the vapors passing from vessel B to vessel D are about 350°. The vapors passing from vessel A to vessel B are about 8% of the total crude and the residuum oil passing from vessel A through the coils 45 is about 6% of the crude.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. A distilling apparatus comprising a plurality of vessels, heating coils in one vessel, means for passing a heating medium through said coils, a condensing coil in another vessel, means for forcing crude oil through said coil, the remaining vessels having partitions therein dividing each vessel into a condensing chamber and a vaporizing chamber, coils arranged in the vaporizing chamber of each of said other vessels, said coils being in communication with the condensing chamber, means for conducting the oil from the condensing coil into the vaporizing chamber of one of said other vessels, means for passing the oil from the last mentioned vessel to the top of the vaporizing chamber, means within said vaporizing chamber for distributing the oil over the coils therein, means for passing some of the oil from the last mentioned vessel into the vaporizing chamber of the other vessel, means for conducting the oil from said last mentioned vessel into the heating vessel, means for passing the oil in each of the last mentioned vessels over the coils therein, means for conducting the vapors successively from one vessel to the other, the vapor finally passing over the condensing coil so that parts of the vapor will be condensed and the oil in the coil heated by said vapor.

2. A distilling apparatus comprising a plurality of vessels, heating coils in one vessel, means for passing a heating medium through said coils, a condensing coil in another vessel, means for forcing crude oil through said coil, the remaining vessels having partitions therein dividing each vessel into a condensing chamber and a vaporizing chamber, coils arranged in the vaporizing chamber of each of said other vessels, said coils being in communication with the condensing chamber, means for conducting the oil from the condensing coil into the vaporizing chamber of one of said other vessels, means for passing the oil from the last mentioned vessel to the top of the vaporizing chamber, means within said vaporizing chamber, for distributing the oil over the coils therein, means for passing some of the oil from the last mentioned vessel into the vaporizing chamber of the other vessel, means for conducting the oil from said last mentioned vessel into the heating vessel, means for passing the oil in each of the last mentioned vessels over the coils therein, means for conducting the vapors successively from one vessel to the other, the vapor finally passing over the condensing coil so that parts of the vapor will be condensed and the oil in the coil heated by said vapor and means for heating the oil in the vaporizing chambers by the oil from the heating vessel.

In testimony whereof, I affix my signature.

STELLA M. WALTER,
*Executrix for John J. Walter, Deceased.*